UNITED STATES PATENT OFFICE.

HARRISON RICH, OF GRAND RAPIDS, MICHIGAN.

CEMENTITIOUS COMPOSITION AND METHOD OF MAKING THE SAME.

1,404,060. Specification of Letters Patent. Patented Jan. 17, 1922.

No Drawing. Application filed February 10, 1921. Serial No. 443,792.

*To all whom it may concern:*

Be it known that I, HARRISON RICH, a citizen of the United States of America, residing at Grand Rapids, in the county of Kent and State of Michigan, have invented certain new and useful Improvements in Cementitious Composition and Methods of Making the Same; and I do hereby declare the following to be a full, clear, and exact description of the invention, such as will enable others skilled in the art to which it appertains to make and use the same.

This invention relates to a cementitious product and the method of producing the same. Heretofore, in order to make concrete or like products using Portland or similar cement, it has been necessary for the best results to use clean sand and gravel, stone or similar aggregate free from earthy materials. The theory is that the voids between the stone or gravel are filled with the mixture of cement and sand and that each particle of sand is covered by a film of cement, the whole making, when the cement has set, a solid and homogeneous product. Earthy products, if placed in the sand or aggregate become a source of weakness in the finished concrete as no binding action of the cement on the earthy products takes place. My invention contemplates the use of earthy products such as clay or any other common dirt material, free from any vegetable ingredients, and its use in the aggregate for the production of a very solid and hard product, the degree of hardness depending upon the amount of cement used and upon the pressure applied for the elimination of voids in the finished product. The invention further contemplates the inclusion of ingredients for rendering the finished material impervious to water, and further for rendering it somewhat rubber-like in consistency, this being particularly desirable when the product is used for road building.

The method which I use in obtaining this product may be briefly outlined as follows:

Clay is very finely ground and pulverized to a fineness substantially equal to Portland cement. Portland cement is mixed thoroughly with this clay. The proportions of cement used with respect to the clay may be varied the same as it is varied with different concretes. I have used the cement and clay in proportions of two to three by weight, though it is to be understood that for many purposes a smaller amount of cement may be used. The mixed cement and powdered clay form the cementitious base of the cementitious product. For a given amount of the product to be made substantially one-third of said amount in weight is furnished by said base and the remainder, substantially two thirds, may be any common earthy material such as clay or any of the common dirts which may be found anywhere. Sand or gravel may be used and I have made use of what is commonly known as "muck," material very common in swamps or swampy lands. This aggregate with the mixed clay and cement base and sufficient water for a desired consistency is thoroughly mixed together and to this mass a small amount, one to five per cent, of finely powdered very hard material such as glass, granite, trap rock, quartz sand or like mineral material is added and thoroughly mixed therewith.

When the cement hardens the whole becomes firmly tied together making a solid and hard concrete. It may be used in making roads, or in making brick, roofing material, building blocks or in various other ways in building. The application of pressure to the product such as is applied in the making of bricks in many brick machines serves to compress the same and greatly eliminates voids with a consequent elimination of porosity. By the use of clay aggregate alone with the addition of a small amount of ground glass and the application of pressure a very hard and dense product is produced and one having a very high degree of hardness. Smaller proportions of cement and different materials in the aggregate will, of course, vary the hardness of the product.

A product made according to the above described process is of value in many places, particularly where it is not too much exposed to the weather. For rendering the product impervious to moisture, I dissolve salt peter and sal ammoniac in the water used in mixing the product, substantially equal amounts of each being used and the water substantially saturated with the same. I also add a quantity of creosote, a hydrocarbon oil which in the mixing of the product thoroughly permeates the same. I am not fully aware of the action of the chemicals which I use beyond the fact that the result is a product which will not absorb water, the combined effects of said chemicals being to fill the pores of the product completely and exclude the entrance of moisture. This is of value, particularly on road surfaces, outside bricks or building blocks and the like.

For road making, it is desirable that the road surface have a certain resiliency which is absent in ordinary concrete roads. By mixing sulphur with the product and applying heat thereto, the sulphur melts and permeates the product, combining therewith and making a surface for roads which, while hard and durable, gives somewhat under road shocks and is resilient to a considerable degree, making a road surface which is easy for travel yet as durable as concrete.

This product has been obtained after long experiment and trial. As an essential it is necessary that first, the two base ingredients, clay and Portland cement, both in very finely powdered form shall be thoroughly mixed together. It is my belief and theory that this finely divided clay and cement when mixed with water forms a cementing film which has affinity with other earthy products so that with the hardening and setting of the same a very hard product is produced. Just what the reason is that the addition of the finely divided very hard material such as powdered glass, powdered granite, quartz sand or the like makes the product harder and more durable, I am not at the present time able to state. It is a fact, however, that it has this effect and the more that is added the better the product is. In practice, anywhere from one to five per cent in weight may be supplied of this finely divided glass or equivalent matter.

I have fully described the product and the method of making the same as it is practiced by me. The proportion of Portland cement mixed with the powdered clay is subject to considerable variation, as well as the different materials entering into the aggregate, as is common with all kinds of concrete products, and I do not wish to be limited to any certain and specific ratio of these different elements in the production of the cementitious product. Likewise, any earthy material may be used for the aggregate and at the same time any gravel, sand or the like in the same does not need to be removed. Use may be made of any earth which is most convenient through the discovery that I have made as to the cementing qualities of Portland cement and finely divided clay when applied to such earthy materials as aggregate in the way outlined.

I claim:

1. A cementitious composition which consists of a base of Portland cement and clay ground to a very fine powder thoroughly mixed together and comprising approximately one third of the mass of the composition, earthy materials comprising approximately slightly less than two thirds of the mass of the composition, and finely divided and powdered very hard material approximately one to five per cent of the mass of the composition, substantially as described.

2. A cementitious composition formed of three essential ingredients as follows: first, a mixture of Portland cement and clay, equaling approximately one third of the composition, said clay being very finely divided and thoroughly mixed with the cement; second, an aggregate made up of earthy materials of slightly less than two thirds of the entire composition; and third, a relatively small amount, approximately one to five per cent, of a very hard material finely ground and divided, which hardens and sets into a solid mass, substantially as described.

3. The method of making cementitious products which consists of mixing Portland cement and finely divided clay to an amount equaling approximately one third of the product to be obtained, adding thereto an aggregate approximately two thirds of the product to be obtained, said aggregate being of earthy materials, and adding thereto a relatively small amount, approximately one to five per cent of a hard finely ground and divided material, mixing the same thoroughly with each other and with water and applying pressure to the mixed mass for the elimination of voids whereby, when the composition has set and hardened, a hard and dense product is obtained, substantially as described.

4. The method of making cementitious products which consists in mixing Portland cement and finely divided clay to an amount equaling approximately one third of the product to be obtained, then adding an aggregate of earthy materials approximating two thirds of the product to be obtained, and then thoroughly mixing the same together with water to make a homogeneous plastic composition which will set and harden to a solid mass, substantially as described.

5. The method of making cementitious products which consists in mixing Portland cement and finely divided clay to an amount equaling approximately one third of the product to be obtained, adding an aggregate of earthy materials approximating two thirds of the product to be obtained, and then thoroughly mixing the same with water in which salt peter and sal ammoniac in substantially equal amounts has been dissolved and to which a quantity of creosote has been added, thereby making a homogeneous plastic composition which will set and harden to a solid mass impervious to the entrance of moisture.

In testimony whereof I affix my signature.

HARRISON RICH.